June 24, 1969     H. G. HENRICKSON     3,451,367
METHOD OF FABRICATING CONTAINER-OPENING DEVICE
Original Filed March 30, 1964     Sheet 1 of 3
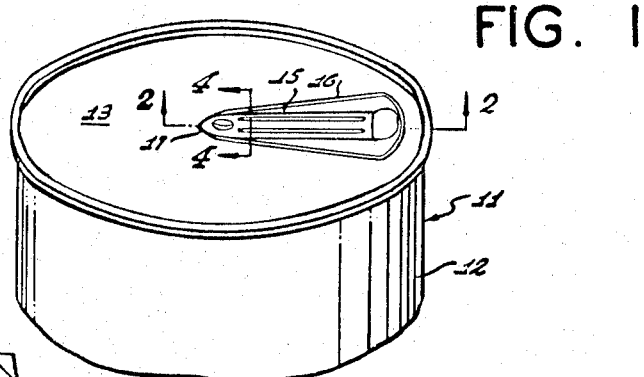
FIG. 1
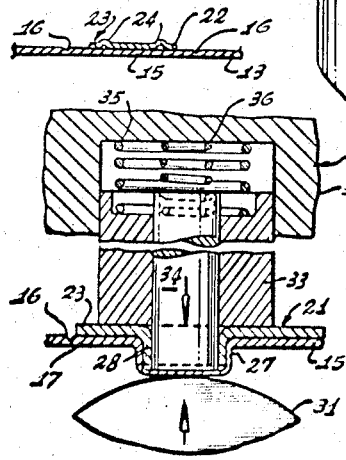
FIG. 4
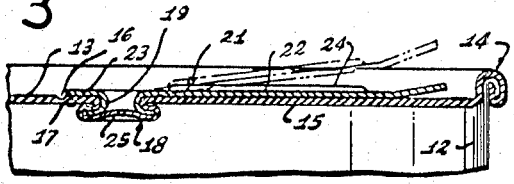
FIG. 3     FIG. 2
FIG. 5
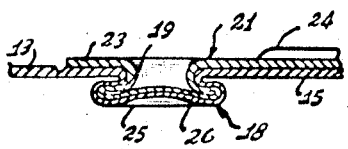
FIG. 6
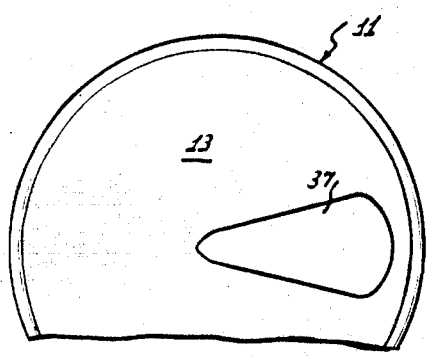
FIG. 7
INVENTOR.
HENRY G. HENRICKSON
BY
ATTORNEY June 24, 1969   H. G. HENRICKSON   3,451,367
METHOD OF FABRICATING CONTAINER-OPENING DEVICE
Original Filed March 30, 1964

INVENTOR.
HENRY G. HENRICKSON
BY
ATTORNEY

June 24, 1969   H. G. HENRICKSON   3,451,367
METHOD OF FABRICATING CONTAINER-OPENING DEVICE
Original Filed March 30, 1964   Sheet 3 of 3
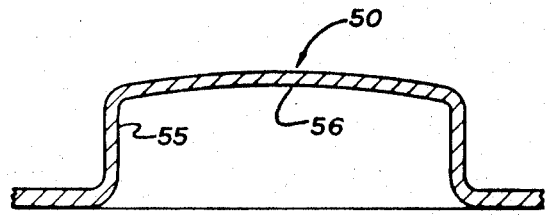
FIG.14
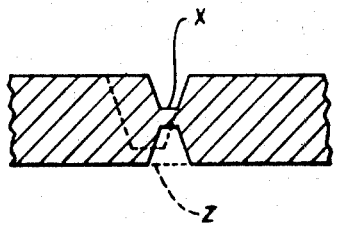
FIG.19a
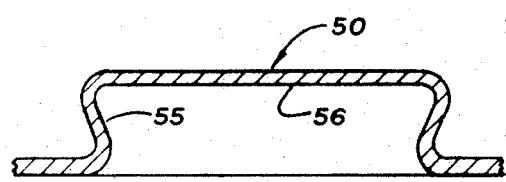
FIG.15
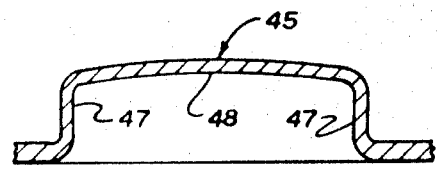
FIG.16
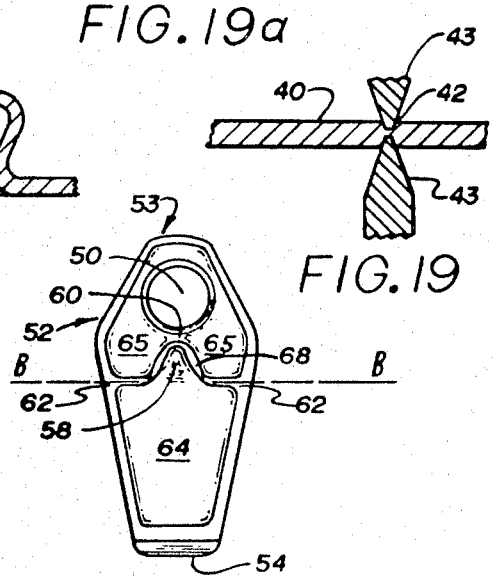
FIG.19
FIG.12a
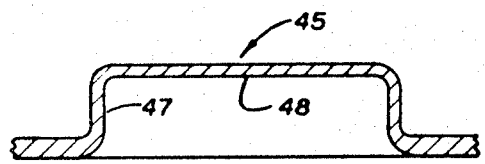
FIG.17
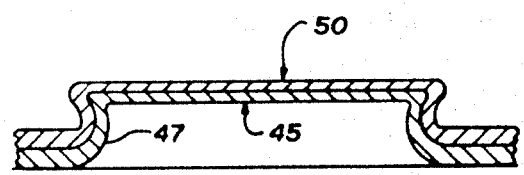
FIG.18
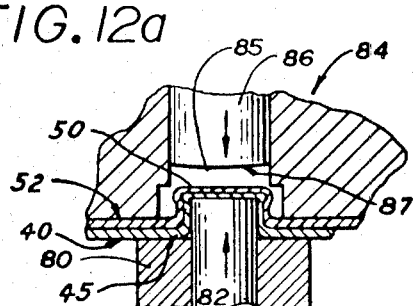
FIG.20
INVENTOR.
HENRY G. HENRICKSON
BY
ATTORNEY United States Patent Office 3,451,367
Patented June 24, 1969

3,451,367
METHOD OF FABRICATING CONTAINER-OPENING DEVICE
Henry G. Henrickson, Oakland, Calif., assignor to Kaiser Aluminum & Chemical Corporation, Oakland, Calif., a corporation of Delaware
Original application Mar. 30, 1964, Ser. No. 355,873, now Patent No. 3,338,463, dated Aug. 29, 1967. Divided and this application Apr. 26, 1966, Ser. No. 627,270
Int. Cl. B21d *51/44;* B65b *17/20*
U.S. Cl. 113—121                                      5 Claims

ABSTRACT OF THE DISCLOSURE

Improved method of affixing a container pull tab to a removable section of a container in such fashion that thinning of the elements being joined is minimized.

---

The instant application is a division of my previously filed application, Ser. No. 355,873, filed Mar. 30, 1964, entitled, "Pull Tab Container Opener," now Patent No. 3,338,463 granted on Aug. 29, 1967, said latter application also being a continuation-in-part of my previously filed application, Ser. No. 293,992, filed July 10, 1963, and now abandoned.

The present invention relates to metal containers and cans, and more particularly to opening means for sealed metal containers providing a pouring opening therein without the use of separate implements or opening tools.

Sealed metal cans and containers are conventionally used for the storing of liquid and/or solid substances. The containers are opened by puncturing and tearing the covers or other walls by means of a special implement or opening tool to provide an access opening through which the contents of the container may be dispensed. The proper implements are often not available when it is desired to use the contents of the container, as a result of which makeshifts must be adopted at considerable inconvenience to the user. Also, such implements require considerable force to effect initial puncturing of the container cover or wall and are a source of possible injury due to the necessary sharpness of the cutting edge.

Attempts have been made in the past to avoid the use of a separate implement or opening tool by providing a tear-strip for the container, which strip is integral with the metal container structure to preserve its sealing integrity and is formed by an area of the container structure outlined by score or tear lines of reduced thickness for easy, guided severance of the tear-strip from the container structure along the outline provided. A pull-tab is attached to the tear-strip near or adjacent one end thereof, and the pull-tab is manipulated to tear and remove the tear-strip from the container structure to provide a pouring or removal opening therethrough.

Such tear-strip openers have not been entirely satisfactory for several reasons, such as weakness of the connection between the pull-tab and the tear-strip whereby they become separated without removing the tear-strip from the container. This separation may occur due to breaking or tearing of the pull-tab itself or by the pull-tab shearing the container wall or cover material at its point of attachment thereto. Another difficulty encountered with such tear-strip is in the force required to effect initial severance of the tear-strip from the container wall or cover to provide the initial tear point from which it is progressively removed.

The present invention provides improved opening means for a sealed can or container which overcomes the disadvantages of previous container opening means. The container opening means of the instant invention is advantageously made in the form of a suitably shaped tear-strip integral with a portion of the container structure, such as the container wall or cover, and outlined by tear lines of reduced thickness, and having a manual pull-tab attached to the tear-strip adjacent an edge thereof without destroying the sealing integrity of the container wall or cover and in a manner to avoid both the breaking or tearing of the pull-tab at the point of attachment and the shearing of the container wall or cover thereat.

The various features of applicant's improved container opening means will be apparent to those skilled in the art from the following specification and the appended drawings, wherein FIG. 1 is a perspective view of an end of a metal container employing an opening means according to the present invention;

FIG. 2 is a vertical sectional view through the container cover and the opening means taken on line 2—2 of FIG. 1;

FIG. 3 is a sectional view illustrating one manner of attaching the pull-tab to the tear-strip in the opening means shown in FIG. 1;

FIG. 4 is a partial sectional view with parts removed through the container cover of FIG. 1 when taken along the line 4—4 thereof;

FIG. 5 is a partial sectional view, similar to FIG. 2, showing a modified form of attachment between the pull-tab and the tear-strip;

FIG. 6 is a partial sectional view, similar to FIGS. 2 and 5, showing a further modified form of attachment between the pull-tab and the tear-strip;

FIG. 7 is a plan view of the container cover with the tear-strip removed therefrom to provide a dispensing opening;

FIG. 12a is a bottom plan view of the pull-tab shown in FIG. 12;

FIGS. 14 and 15 show various operational steps involved in forming a suitable rivet or hollow button-like attachment element on the pull-tab;

Figure 13:
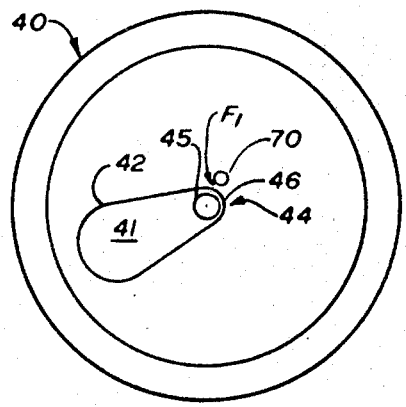
FIG. 13 is a top plan view of a container cover provided with a suitable tear-strip and without the pull-tab of FIG. 12 attached thereto.
Figure 12:
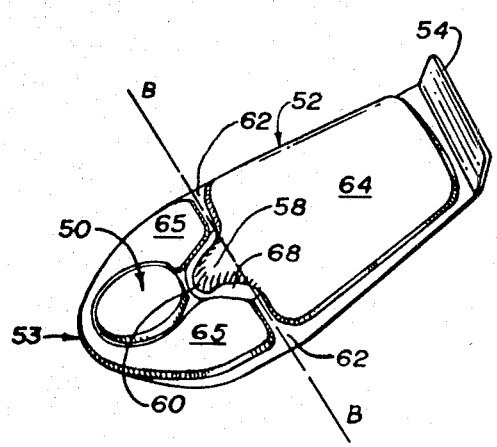
FIG. 12 is a perspective view of a preferred embodiment of the pull-tab shown in FIG. 8.

FIGS. 16 and 17 disclose various operational steps involved in fabricating a complementary button-like attachment element on the container structure of FIG. 13;

FIG. 18 discloses the final assembly of the attachment or button-like elements on the tear-strip and pull-tab;

FIG. 19 discloses a preferred arrangement for forming the tear lines which define the tear-strip;

FIG. 19a is an enlarged cross-sectional view through a tear line; and

FIG. 20 is a fragmentary sectional view of a suitable apparatus for use in securing the button-like attachment elements together.

Referring first to the embodiment of the invention illustrated in FIGS. 1–4 of the drawings, the container or can 11 has a body portion 12 that can be advantageously formed of thin sheet metal of any configuration and of any desired material, such as aluminum or an aluminum alloy or other metals. The opposite ends of the body 12 are sealably closed in a conventional fashion by end closure members of which the drawing illustrates a top or cover 13 sealably attached to the upper edge of the body portion 12 in a conventional manner at 14. The cover 13 can also be made of sheet metal or of any desired material having sufficient strength to withstand the pressures, if any, which may be built up internally of the can by the nature of the contents thereof. For ease of severing and tearing out the tear-strip, covers of a light metal, such as aluminum or an aluminum alloy, are preferred.

The tear-strip shown at 15 provides an area which is an integral part of the cover 13 and is outlined by suitable tear lines, such as tear lines 16, which are scored in the metal cover 13 by metal displacement to form the lines by scoring or thinning the cover material thereat on one side or on both sides of the cover structure 13 in the manner indicated, for example, in FIG. 19 to form double aligned scores. It is to be understood, of course, that the particular configuration and location of the tear-strip 15 will be dictated by the particular product being dispensed and the particular container being used. For illustrative purposes, the tear-strip 15 is shown in the drawings as being of generally triangular form with its base adjacent the outer edge of the cover and its apex 17 inwardly thereof.

An integral hollow button or rivet-like element 18 is formed from the material of the tear-strip 15 adjacent the apex 17 thereof. Within the hollow button 18 is disposed a complementary hollow button 19 formed from a pull-tab 21 adjacent one end thereof. This provides an elongated finger-manipulated portion 22 extending from the button 19 toward the base of the tear-strip 15, and a shorter portion or work-performing end 23 extending from the button 19 to the edge of the apex 17 of the tear-strip 15. The end 23 is preferably pointed, as shown in FIG. 1, and the apex of the pointed end 23 of the pull-tab 21 preferably coincides with and overlies the apex 17 of the tear-strip 15. The pull-tab 21 can, if desired, be advantageously formed of a material harder and/or thicker than the cover 13, such as a hard aluminum alloy or steel. Its finger end 22 may be provided with stiffening ribs 24.

The hollow button 18 is drawn with an integral closing wall portion 25 to preserve the sealing integrity of the cover 13 which therefore still presents an imperforate interior sealing surface. The hollow button or rivet 19 can optionally be open, as shown in FIG. 2, or can have an integral closing wall complementary to the closing wall 25, as shown in the modification of FIG. 5. Since the button 19 does not contribute to the sealing of the container, it can desirably be left open, as in FIG. 2, so that less metal need be displaced from the main body portion of the pulling tab in the drawing operation during which button 19 is formed. As a result, the overall button 19 will be of substantially the same gauge or thickness of material as the rest of pull-tab 21 from which it is formed, and thus be of a relatively stiff and strong construction.

FIG. 3 illustrates diagrammatically one manner of forming the attachment between the tear-strip and pull-tab of this invention. A cup-shaped button 27 is drawn inwardly of the cover 13 within and adjacent the apex 17 of the tear-strip 15. A complementary tubular projection 28 is drawn or extruded from the under surface of the pull-tab 21 adjacent the pointed end 23 thereof so that when the tubular projection 28 is nested in the cup 27, the apex of end portion 23 of the pull-tab will be substantially coincident with the apex 17 of the tear-strip and the pointed edge 23 substantially at the tear lines 16. The nested parts 27 and 28 are then compressed between an upper die member 29 and a lower die member 31. The lower die member 31 preferably has a spherical engaging surface to insure the proper bending of the walls of the parts 27 and 28 to form the fully nested interlocked and complementarily configured buttons 18 and 19 and with button-like attachment element 18 being located within the complementary element 19. The upper die element has a body portion 32 and a pair of concentric die elements 33 and 34 mounted thereon and biased outwardly therefrom by springs 35 and 36, respectively. The tubular die element 33 insures that the adjacent surfaces of the pull-tab and the tear-tab will be tightly engaged, and the central die element 34 insures that the parts 27 and 28 will not collapse inwardly, but will be formed outwardly into the button shapes 18 and 19 of FIG. 2.

To open the container of this invention, the finger end 22 of the pull-tab 21 is first lifted or tilted upwardly as shown in dotted lines in FIG. 2. The pull-tab 21 in this operation functions as a lever rotating generally about its attachment to the tear-strip by bending the material thereof. In this tilting of the pull-tab, its pointed end 23 will move downwardly and inwardly of the can 11 and, by the mechanical advantage of the lever, will exert a large unit pressure upon the apex 17 of the tear-strip to effect easy initial puncturing or shearing of the tear-strip from the main body of the cover 13 at the tear lines 16. This severance is effected by downward movement of the apex end 17 of the tear-strip, inwardly of the can 11, as a result of the forceful, prying action of the pull-tab pointed portion 23. After the apex 17 of the tear-strip is thus severed from the main body of the cover, the pull-tab 21 is lifted bodily upward, as distinguished from its initial tilting action, to move the apex end of the tear-strip and the attachment between the pull-tab and the tear-strip bodily upwardly, whereby the tear-strip is progressively severed from the main body of the cover 13 by tearing along the tear lines 16 until it is entirely removed from the cover 13 to leave the generally triangularly shaped opening 37 through the cover 13, as shown in FIG. 7. The contents of the container 11 may then be poured through this convenient opening, or may be drunk directly from the can, as desired.

The modification of FIG. 5 has been briefly described as substantially the same as the embodiment of FIG. 2, except that the pull-tab button 19 has a closing wall 26 which is complementary to and adjacent the closing wall 25 of the button 18, the buttons being nested together and interlocked to form a strong and reliable attachment between the pull-tab and the tear-strip.

The modification of FIG. 6 is similar to that of FIG. 5, except that the buttons 18 and 19 are reversed to place the pull-tab button 19 on the outside and the tear-strip button 18 on the inside. The buttons 18 and 19 are formed in the same manner as previously described, but are now drawn upwardly from the cover 13 and from the upper surface of the pull-tab. In some instances, the outward projection of the attachment buttons may present objectionable interference, in which case the inwardly projecting buttons, as in FIGS. 2 and 5, would be preferred.

It is, therefore, seen that the container opening means according to the present invention provides a tear-strip which is readily severable from the container by tearing along tear lines provided in a container wall or cover. A pull-tab is attached to the tear-strip with a strong and reliable connection therebetween which also provides for rounded-surface engagement of the pull-tab with the tear-strip at the attachment so that there is no tendency for the pull-tab to shear through the container wall or cover at the attachment point. The attachment also maintains all the strength of the pull-tab itself since all of its material is retained in the attachment. There is, therefore, little or no tendency for the pull-tab to fracture or to tear away from the tear-strip in the container-opening operation.

It will further be seen that initial severance of the tear-strip from the container wall is facilitated by tilting or rotating movement of the pull-tab in which the shorter, free end thereof is forced inwardly of the container as the finger end is moved outwardly so that an exceptionally strong prying action is exerted at the edge of the tear-strip to effect easy initial severance thereof by moving it inwardly of the container wall. Thereafter, the pull-tab and the tear-strip are moved bodily together outwardly of the container to tear the tear-strip from the container wall along the tear lines therein. The pointing of the inwardly probing end of the pull-tab concentrates the force it exerts into a small area which, combined with the mechanical lever advantage, given a high initial shearing or severing pressure for a relatively light lifting force on the finger end of the pull-tab.

It is also to be observed, reference being made particularly to FIGS. 2 and 6, that during the initial pivoting of pull-tab 21 when the greatest lifting force is being applied to the buttons 18 and 19 and severe stresses are induced not only in buttons 18 and 19 but also in the areas of tab 21 adjacent buttons 18 and 19, an advantageous use is made of the curvature and composite structure or double thickness of material present in the area $a$ of the buttons of FIG. 2 and area $b$ of the buttons of FIG. 6. These areas generally comprise the outer peripheral portions of the buttons 18 and 19 that are located adjacent the finger end portion 22 of tab 21. The curvature of the buttons 18 and 19 in areas $a$ and $b$ offers the minimum resistance to the tilting of tab 21 and thus minimizes the possibility of fracture of tab 21 adjacent the buttons 18 and 19, while the double thickness of material enhances the resistance to separation, shearing and possible fracture of the buttons 18 and 19 themselves.

A preferred embodiment of the invention as indicated in FIGS. 8–12a contemplates that a portion of the container structure, such as an end cover 40, be provided with a tear-strip section or segment 41 which is defined or outlined by a tear line 42. This tear line is advantageously formed as indicated in FIG. 19 by scoring or thinning a thin metallic sheet material making up the container end 40 from opposite sides thereof by suitable scoring elements 43. By forming a tear line through the use of aligned double scores located in alignment transversely of the plane of the cover, a small bridging width of material joining the tear-strip to the main container wall structure can be left, such as the width X shown particularly in FIG. 19a. This relatively small width X provides a relatively shallow edge which minimizes injury to the user of the container upon fracture of the tear line. In contrast, in the case where the tear line is scored or pressed from one side only of the container structure, it will leave a much wider bridge of material, such as is shown in dotted lines at Z in FIG. 19a, which on fracture will form a relatively wide blade-like projection.

The double penetration of the cover 40 from both sides to form the tear line also provides concentrated stress points which can be more easily fractured than where the scoring or thinning is effected on only one side of the material making up the container structure 40. The advantages in the use of a double score are, therefore, twofold. First of all, it provides for a more readily separable tearstrip.

Secondly, it minimizes injury to the user of the container provided with the opening device of the instant invention.

Located adjacent the terminal end portion 44 of the tear-strip is a hollow rivet-like or button-like element 45 which is formed from the material making up the tearstrip whereby it is formed integrally therewith. It will be noted that this button-like element 45, which is shown in FIG. 13, in a partially formed condition, is advantageously located as closely adjacent as practical to the segment or portion 46 of the tear line 42 which makes up or defines the terminal end portion 44 of the tear strip 41. As will be indicated more fully hereinafter, the sinuous wall section 47 of the compeltely formed attachment or button-like element 45, as well as the end wall 48 of the rivet 45, advantageously have substantially the same thickness such that all portions of the button-like element 45 can be said to be of substantially the same thickness.

Figure 10:
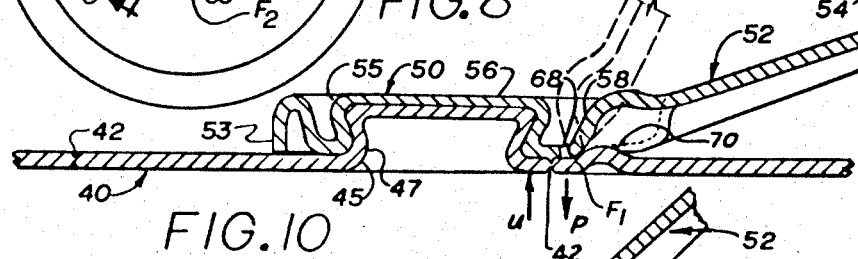
FIG. 10 is an enlarged fragmentary cross-sectional view similar to FIG. 9 and discloses an initial step in effecting an opening of the container structure shown in FIG. 8.
Figure 11:
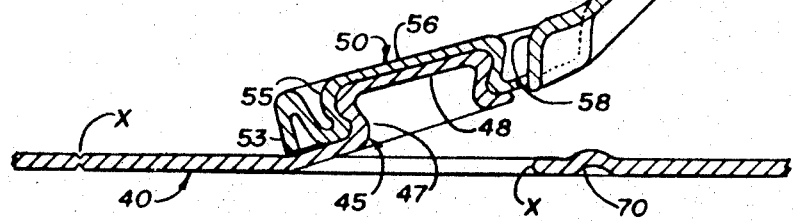
FIG. 11 is a cross-sectional view similar to FIG. 9 and discloses a further step in obtaining separation of the tear-strip from the container structure shown in FIG. 8.

Interlocked with and superposed upon the button-like element 45 is a complementarily configured attachment element or rivet 50. Rivet 50 is slightly larger than rivet 45 so as to fit thereover in snug interlocking and nesting engagement. Button-like element 50 forms the attachment portion of the pull tab 52. Pull tab 52, as indicated particularly in FIGS. 10, 11 and 12a, is so formed that it is advantageously provided with a rounded-off terminal end portion or nose 53 which can overlie and intersect a portion or segment of the tear line 42 in the manner indicated, for example, in FIG. 8. At the same time, the pull-tab can be arranged, if desired, on the structure 40 such that the pull-tab is angularly disposed with respect to the longitudinal axis of the tear-strip and with said axes intersecting at the point of attachment of the tab and strip. During fabrication of the pull-tab 52, the button-like element 50 of the pull-tab is also located as closely adjacent the terminal end portion 53 of the pull-tab as is practical. The opposing terminal end 54 of the pull-tab 52 is advantageously provided with a raised finger-engaging portion. The rivet-like element 50 is also so constructed that the sinuous upstanding wall portion 55 of the finally formed rivet is substantially of the same thickness as the end wall 56 of the rivet. As a consequence, the maximum amount of metal will be provided in the overall structures of the finally formed and interlocked attachment elements 45 and 50 whereby a secure and reliable attachment of these button-like elements 50 and 45 will be obtained and no inherent weakness will be necessarily built into the final interlocked assembly of these button-like elements. As in the case of the opening devices shown in FIGS. 1–7, an advantageous use is made of the curvature and composite structure or full double thickness of material present in wall structures 47 and 55 of the button elements 45 and 50.

The pull-tab is also so constructed whereby it is advantageously provided with a claw-like or finger element 58 struck from the main body portion of the pull tab 52. It will be noted by particular reference to FIGS. 8, 12 and 12a of the drawings that the free terminal end portion 60 of this finger element which forms a point of relatively small radius is generally aligned with the principal longitudinal axis of the pull-tab, as well as with the central axis of the rivet element 50. This claw element is generally bounded or encompassed by the roughly V-shaped slit 68, the legs of which terminate in the general area of the readily bendable portions 62 on the pull-tab whereby these bendable portions provide a convenient bending axis B—B for the finger element 58 upon the pivotal movement thereof into engagement with a primary fulcrum area $F_1$ on the container cover or structure 40. The pull-tab 52 can also be advantageously reinforced by the outwardly projecting embossments 64 and 65 to provide rigidity.

As indicated particularly in FIGS. 10 and 11, the pull-tab 52 is so formed that when mounted upon the container cover or structure 40 the tip 60 of the finger element 58 thereof is advantageously spaced slightly outwardly from segment 46 of the tear line 42 of cover structure 40. At the same time, segment 46 of the tear line 42 is located as close as practical to the upstanding walls of the rivet assembly.

In order to facilitate and insure the proper actuation and operation of finger element 58, the cover or container structure 40 can be advantageously provided with a small bulbous or dome element 70 which is adapted to underlie and properly orient the finger element 58. The outer surface of dome element 70 provides a sliding and elevated bearing surface of the finger element at the time the latter is manipulated.

Figure 8:
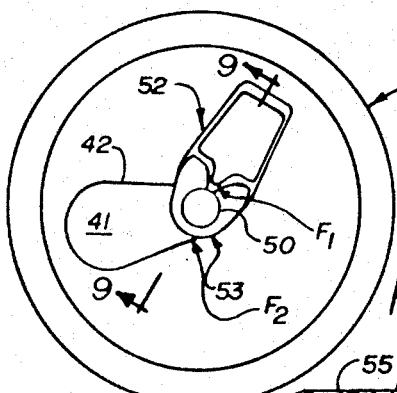
FIG. 8 is a plan view of a further preferred embodiment of the invention.
Figure 9:
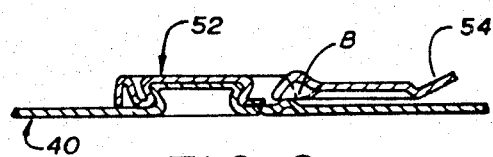
FIG. 9 is a fragmentary cross-sectional view of the container structure shown in FIG. 8 when taken generally along line 9—9 thereof.

The operation of the opening device of FIG. 8 of the instant invention will now be described, reference being made particularly to FIGS. 10 and 11. As indicated in FIG. 10, the outermost or finger-engaging end 54 of the pull-tab is raised upwardly in such a fashion that the claw-like element 58 rotates about the bending axis B—B until its terminal end 60 contacts the outer surface of the container cover structure 40 generally at the fulcrum area F₁. Continued lifting of this finger-engaging end 54 of the pull-tab causes the end 60 of element 58 to exert a high downward force or high unit stress upon the container structure in the area $F_1$, as indicated by the arrow P in FIG. 10. A reactive opposing upward force or thrust shown by another arrow U in FIG. 10 is then caused to be exerted simultaneously through the locked-together rivet-like elements 45 and 55 so as to place the bridging material of the segment 46 of the tear line 42 in effective shear. During this time, the end 60 of element 58 rides up the wall of the dome 70 and elevates the bending axis B—B. When the shearing force reaches a sufficient magnitude, an initial separation of the tear strip 41 from the remainder of the container cover or structure 40 proper occurs. As the downwardly acting force P is exerted on the container structure 40 in the primary fulcrum area $F_1$, the opposing upwardly acting force U is translated through the locked-together button-like elements 45 and 50 to the terminal end portion or nose 53 of the pull tab. This end portion then establishes a secondary fulcrum area $F_2$ in the manner shown in FIG. 8.

Thus, whereas in other opening devices the operator is forced to rely solely on the lifting or pulling action of a single lever in order to effect separation and severing of a tear-strip from a container, the instant invention makes advantageous use of a combination of levers in an improved fashion so as to place the bridging material of the tear line 42 in direct shear. The advantage of locating the segment 46 of the score line 42 as closely adjacent the primary fulcrum area $F_1$ as possible will now be obvious since it is in this segment of the tear line 42 where it is desirable to initiate the fracture of the tear line.

Once the tear-strip has been separated within segment 46 of the tear line 42, the remaining unsevered portions of the tear-strip can then be easily broken away from the container structure 40 and removed by further upward lifting of the pull-tab 52 bodily in the manner shown in FIG. 11. The critical part of the entire opening operation occurs in the very beginning wherein the initial rupturing and fracturing of the tear-strip along the tear line must be effected in the simplest possible fashion and without injury to the operator of the opening device and this is efficiently accomplished by the opening devices of the instant invention.

In order to provide an efficient attachment or assembly between the respective button-like elements 45 and 50, a unique method is employed for fabricating each of these button-like elements and for joining the same together, which will now be described. As indicated particularly in FIGS. 14 and 15, the cover structure 40, as in the case of that shown in FIGS. 1–7, can be formed from suitable thin metallic aluminum alloy stock material on the order, for example, of .015″ thick. A portion of this stock material is then deformed in such a fashion as to provide a button-like element 50 having an upstanding wall 55 and an end wall 56, both of which are of substantially the same thickness, for example, on the order of .008″ in thickness. The end wall 56 is first formed so as to have the somewhat concavo-convex crown shown in FIG. 14. The element 50 is then partially collapsed or compressed as indicated in FIG. 15 so as to facilitate the attachment of this element 50 to the tear-strip element 45, with the end wall 56 being flattened. During this second operation of partially collapsing the button-like element 50, the end and side walls 56 and 55 are not subjected to a thinning operation.

In a further operation, the thin metallic container structure 40 is deformed to provide a button-like element 45 of a smaller overall size than rivet 50. In the production of element 45, structure 40 can be deformed in such a fashion that the upstanding wall 47 and the end wall 48 are of the same but lesser thickness than the main portion of the cover 40. Thus, for example, while the main portion of the metallic structure 40 could be on the order of .015″ in thickness, both the side wall 47 and the end wall 48 could be on the order of about .008″ in thickness. If desired, the button-like element 45 can be made in a two-step operation. In this instance, in a first forming operation, the button 45 is made slightly undersize with the end wall 48 also having a slightly concavo-convex configuration as shown in FIG. 16. Thereafter, in a subsequent restriking operation, the button 45 is expanded as indicated in FIG. 17 to the desired size but without effecting any material thinning of either the end or side wall whereby the finally formed side and end walls 47 and 48 will still retain substantially their original thickness of .008″. In the restriking operation end wall 48 is also desirably flattened.

The two button-like elements 45 and 50 are finally assembled by nesting them and compressing them together, as shown in FIG. 18. The initial partial compression of element 50, as shown in FIG. 15, facilitates the later further compression of the elements in that it acts as a built-in control feature and provides for directionally controlled collapsing of the elements about one another so that a thinning of the end walls 56 and 48 is advantageously inhibited.

Any suitable apparatus may be employed for effecting the assembly of the tear-strip and pull-tab rivet elements 50 and 45. For example, the tooling employed may comprise a suitable tool holder or anvil device 80 having a spring-loaded anvil plunger 82 mounted therein, the plunger 82 being received within the hollow rivet element 45. An upper clamping device 84 provided with a suitably stepped chamber 85 is movably disposed above anvil device 80 to clamp the pull-tab 52 and container structure 40 thereagainst with the rivets 45 and 50 in assembled relation. The hammer 86 is then moved downwardly to complete the compression or collapse of the rivets 45 and 50 in the proper interlocked relationship as shown in FIG. 18. The hammer surface 87 is advantageously made slightly convex so as to facilitate the proper direction of collapse of the various rivet walls.

It is to be understood that while the rivets 45 and 50 are shown as being located on the top of the container cover 40, they could be located on the underside of the cover in the same fashion as indicated in FIG. 5. In this instance, however, the rivet 50 would become the innermost rivet and rivet 45 would become the outermost rivet.

It is to be further understood that the above-described formation and assembly steps of the rivet elements 45 and 50 can be performed in various ways depending upon the particular mass production requirements involved. Further, the steps of forming the dome 70 and tear line 42 in the case of the container structure 40 may advantageously be performed either separately or during one of the steps used to form the rivet 45. Likewise, the formation of the finger element and the various embossments on the pull-tab can be effected either by separate operations or during one of the formative steps involved in fabricating the rivet 50.

While certain preferred embodiments of the invention have been specifically illustrated and described herein, it is understood that the invention is not limited thereto as many variations will be apparent to those skilled in the art, and the invention is to be given its broadest interpretation within the terms of the following claims.

What is claimed is:

1. A method of affixing a container opening tab to a removable section of said container comprising the steps of deforming a portion of the material of said tab to produce a first hollow button-like element thereon substantially all portions of which have substantially the same thickness throughout while at the same time being of less thickness than the remaining portions of the said material, partially collapsing said button-like element while retaining the same thickness in substantially all portions thereof; deforming a portion of said removable section to produce a second button-like element thereon complementary in configuration to said first button-like element and having substantially the same thickness throughout while at the same time being of less thickness than the remaining portions of the removable section and nesting said button-like elements one within the other and thereafter compressing both of said button-like elements about each other while at the same time avoiding any material thinning of substantially all of the various portions of the button-like elements.

2. A method of affixing a container opening tab to a removable section of said container comprising the steps of deforming a portion of the material of said tab to produce a first hollow button-like element thereon substantially all portions of which have substantially the same thickness throughout while at the same time being of less thickness than the remaining portions of the said material, deforming a portion of said removable section to produce a second button-like element thereon complementary in configuration to said first button-like element and having substantially the same thickness throughout while at the same time being of less thickness than the remaining portions of the removable section, and nesting said button-like elements one within the other and thereafter compressing both of said button-like elements about each other while at the same time avoiding any material thinning of substantially all of the various portions of the button-like elements.

3. A method of affixing a container opening tab to a removable section of said container comprising the steps of deforming a portion of the tab to produce an upstanding first button-like element thereon wherein substantially all portions of said button-like element have substantially the same thickness while at the same time being of less thickness then the remaining portions of the tab, partially collapsing said button-like element while retaining substantially the same thickness in the various portions thereof, deforming a portion of said removable section to produce a second upstanding button-like element similar in configuration but of a slightly smaller size than said first button-like element, with said second button-like element also having substantially the same thickness throughout but at the same time being of less thickness than the remaining portion of the said removable section, striking out a finger element in said opening tab and inserting such second button-like element within said first button-like element and compressing said button-like elements about each other while at the same time avoiding any material thinning of the various portions of either of the button-like elements.

4. A method as set forth in claim 1 including the step of defining the removable section by doubly scoring opposite sides of the material of the container to leave a narrow bridge of readily tearable material intermediate the opposite surfaces of the material.

5. A method as set forth in claim 2 including the step of defining the removable section by doubly scoring opposite sides of the material of the container to leave a narrow bridge element of readily tearable material intermediate the opposite surfaces of the material.

References Cited
UNITED STATES PATENTS

| | | | |
|---|---|---|---|
| 3,198,155 | 8/1965 | Fraze | 113—121 |
| 3,359,935 | 12/1967 | Rosbottom | 113—116 |
| 3,366,086 | 1/1968 | Fraze | 113—121 |

RONALD D. GREFE, *Primary Examiner.*